(12) United States Patent
Ravuru

(10) Patent No.: US 12,198,434 B2
(45) Date of Patent: Jan. 14, 2025

(54) DYNAMIC TRIGGERING AND PROCESSING OF PURCHASE BASED ON COMPUTER DETECTION OF MEDIA OBJECT

(71) Applicant: Roku, Inc., San Jose, CA (US)

(72) Inventor: Rakesh Ravuru, San Jose, CA (US)

(73) Assignee: Roku, Inc., San Jose, CA (US)

( * ) Notice: Subject to any disclaimer, the term of this patent is extended or adjusted under 35 U.S.C. 154(b) by 371 days.

(21) Appl. No.: 17/659,456

(22) Filed: Apr. 15, 2022

(65) Prior Publication Data

US 2023/0334865 A1 Oct. 19, 2023

(51) Int. Cl.
| G06V 20/40 | (2022.01) |
| G06N 20/00 | (2019.01) |
| H04N 21/433 | (2011.01) |
| H04N 21/478 | (2011.01) |

(52) U.S. Cl.
CPC ............ *G06V 20/46* (2022.01); *G06N 20/00* (2019.01); *G06V 20/41* (2022.01); *H04N 21/4333* (2013.01); *H04N 21/47815* (2013.01)

(58) Field of Classification Search
None
See application file for complete search history.

(56) References Cited

U.S. PATENT DOCUMENTS

| 8,213,916 B1 * | 7/2012 | Yankovich ....... H04N 21/44008 455/414.3 |
| 10,395,120 B2 * | 8/2019 | Chen ..................... G06V 10/56 |
| 10,699,750 B1 * | 6/2020 | Pham ................. H04N 21/4725 |
| 11,049,176 B1 * | 6/2021 | Drynan ................ G06Q 20/123 |
| 11,416,918 B2 * | 8/2022 | Drynan ............... G06Q 30/0633 |
| 11,468,491 B2 * | 10/2022 | Dalal .................... G06V 30/153 |
| 11,589,128 B1 * | 2/2023 | Greiner ............. G06Q 30/0633 |
| 11,694,280 B2 * | 7/2023 | Drynan ................ H04N 21/812 705/14.23 |

(Continued)

OTHER PUBLICATIONS

Appalaraju et al., "Image similarity using Deep CNN and Curriculum Learning," Computer Vision and Pattern Recognition, arXiv:1709.08761, 2017, 9 pages.

(Continued)

*Primary Examiner* — Anand P Bhatnagar
(74) *Attorney, Agent, or Firm* — McDonnell Boehnen Hulbert & Berghoff LLP

(57) ABSTRACT

A method and system for processing a purchase based on image recognition in a video stream being presented by a computing system. A method includes receiving a first user-input defining a first user-request to pause presentation of the video stream, and, responsive to the first user-input, pausing by the computing system the presentation of the video stream at a video frame. Further, the method includes detecting based on computer-vision analysis of the video frame, at least one object depicted by the video frame. Additionally, the method includes correlating the detected object with at least one purchasable item and presenting a prompt for purchase of the at least one purchasable item. Also, the method includes receiving a second user-input requesting to purchase a given one of the at least one purchasable item and processing, responsive to receiving the second user-input, a purchase of the given purchasable item for the user.

19 Claims, 9 Drawing Sheets

(56) References Cited

U.S. PATENT DOCUMENTS

| | | | | |
|---|---|---|---|---|
| 2012/0304065 | A1* | 11/2012 | Cai | G06F 16/748 |
| | | | | 715/719 |
| 2017/0255830 | A1* | 9/2017 | Chen | G06V 20/41 |
| 2020/0099986 | A1* | 3/2020 | Volk | H04N 21/47815 |
| 2021/0097292 | A1* | 4/2021 | Kang | G06V 20/46 |
| 2021/0217077 | A1* | 7/2021 | Drynan | G06K 7/1095 |
| 2021/0312536 | A1* | 10/2021 | Drynan | H04N 21/812 |
| 2021/0342914 | A1* | 11/2021 | Dalal | G06V 20/20 |
| 2022/0398644 | A1* | 12/2022 | Dalal | G06N 20/00 |
| 2023/0162293 | A1* | 5/2023 | Drynan | H04N 21/6582 |
| | | | | 705/14.23 |
| 2023/0388600 | A1* | 11/2023 | Greiner | G06F 16/9558 |
| 2024/0013281 | A1* | 1/2024 | Dalal | G06V 30/153 |
| 2024/0144392 | A1* | 5/2024 | Drynan | G06Q 20/3276 |

OTHER PUBLICATIONS

Bell et al., "Learning visual similarity for product design with convolutional neural networks," ACM Transactions on Graphics, Aug. 2015, 10 pages, vol. 34, No. 4.

Benhur, Sean, "A friendly introduction to Siamese Networks," https://towardsdatascience.com/a-friendly-introduction-to-siamese-networks-85ab17522942, Sep. 2, 2020, 13 pages.

Bromley et al., "Signature Verification using a "Siamese" Time Delay Neural Network," NIPS'93: Proceedings of the 6th International Conference on Neural Information Processing Systems, Nov. 1993, pp. 737-744.

Bruballa, Raul Gomez, "Implementing Content-Based Image Retrial With Siamese Networks in PyTorch," https://neptune.ai/blog/content-based-image-retrieval-with-siamese-networks, Nov. 9, 2021, 12 pages.

Gupta, Harshvardhan, "One Shot Learning with Siamese Networks in PyTorch," https://hackernoon.com/one-shot-learning-with-siamese-networks-in-pytorch-8ddaab10340e, Part 1, Jul. 8, 2017, 7 pages.

Gupta, Harshvardhan, "Facial Similarity with Siamese Networks in PyTorch," https://medium.com/hackernoon/facial-similarity-with-siamese-networks-in-pytorch-9642aa9db2f7, Part 2, Jul. 20, 2017, 10 pages.

Redmon et al. "YOLO9000: Better, Faster, Stronger," arXiv:1612.08242v1, Dec. 25, 2016, 9 pages.

Reni, D. Robin, "Simese Neural Network (with Pytorch Code Example)," https://innovationincubator.com/siamese-neural-network-with-pytorch-code-example/, Jan. 28, 2019, 9 pages.

Wang et al., "Learning Fine-grained Image Similarity with Deep Ranking," arXiv:1404.4661v1, Apr. 17, 2014, 8 pages.

* cited by examiner

DYNAMIC TRIGGERING AND PROCESSING OF PURCHASE BASED ON COMPUTER DETECTION OF MEDIA OBJECT

BACKGROUND

A typical media-presentation system operates to facilitate presentation of media content, such as video, audio, or multi-media content, to end users. An example of such a system could include client-side equipment positioned at customer premises and arranged to output and present media content on a user interface such as a display screen with an associated sound system, and server-side equipment arranged to serve media content to the client-side equipment for presentation.

By way of example, the client-side equipment could include a media-presentation device such as a television (TV), monitor, tablet computer, or mobile phone, which could present the media content on a user interface. Further, the client-side equipment could include a media player such as an over-the-top (OTT) streaming media player, cable or satellite set top box, digital video recorder, disc player, gaming system, mobile phone, personal computer, audio/video receiver, or tuner, which could be integrated with or in local or network communication with the media-presentation device and could output media content to the media-presentation device for presentation on the user interface. And the server-side equipment could include a media server and/or head-end equipment, operated by an OTT provider (e.g., virtual multichannel video programming distributor (virtual MVPD), cable or satellite TV provider, or the like), which could stream or otherwise deliver media content to the client-side equipment for presentation.

In operation, a user at the customer premises may control the client-side equipment, to cause the system to present a desired media-content item, such as a movie, TV show, or video game, among other possibilities, any of which might be locally-stored, broadcast, or on-demand, also among other possibilities. For instance, the media-presentation system may present the user with an on-screen media-content selection menu, and the user may operate a remote control to navigate through that menu, to select a desired media-content item, and to direct the system to present the selected media-content item. In response, possibly through interaction between the client-side equipment and the server-side equipment, the client-side equipment could obtain and present the selected media-content item to the user. And the user may then enjoy presentation of that selected media-content item.

SUMMARY

When a user watches media content, the user may see something depicted in the media content and may wish to make a related purchase. For example, as a media-presentation system presents a video stream where the main character drinks from a water bottle and as the user watches that video stream, the user may see that water bottle in the presented video stream and may wish to purchase the same or a similar water bottle. One technical problem with that situation, however, is that the user may need to remember to separately shop for the related item, which may be inconvenient while the user is watching the video stream. Further, another technical problem is that the user shopping for the related item may not benefit a provider of the media-presentation system.

The present disclosure provides a technical advance that may help to address these problems, helping to facilitate user purchases of goods or services related to objects appearing in a video frame, and also possibly benefitting a provider of the media-presentation system. In particular, the disclosure provides for using computer vision to detect an image of an object in media content and then responsively invoking a process to allow user purchase of an associated product or service, possibly processing the purchase through a provider of the media-presentation system.

Various methods disclosed herein could be carried out by a media-presentation system, which could include a media-presentation device such as a streaming media receiver or television for instance. In accordance with the disclosure, as the media-presentation system is presenting media content to a user, the system could receive user input such as a "scan for purchase" request, and the system could responsively pause the video presentation and apply neural-network-based computer vision and pattern recognition techniques, among other possibilities, to search for known objects depicted in the paused video frame. Upon finding one or more such objects, the media-presentation system could then highlight (e.g., with a bounding box) each such identified object on a display screen and allow user selection of a desired object from the one or more highlighted objects. Further, upon receipt of the user input selecting a given such object, the media-presentation system could then present the user with a dialog specifying one or more purchase options for a purchase related to the detected object, such as to purchase an instance of the detected object or to purchase a related object or service for example, and the media-presentation system could then process a user-requested purchase in accordance with a selected one of the presented purchase options.

In another implementation, the media-presentation system may carry out aspects of this process autonomously, without receiving express user input to trigger the process. For example, the media-presentation system may engage in advanced neural-network-based evaluation of the media content to detect one or more depicted objects and may then automatically cause purchase options to be presented in the form of ads during commercial breaks and/or at the conclusion of the presented video, among other possibilities.

To facilitate this process in practice, a manufacturer or other provider of the media-presentation system could partner with e-commerce providers or other entities who could provide images (e.g., multi-view images) of objects available for purchase or having associated items available for purchase, and could provide associated purchase-processing information. Alternatively or additionally, the media-presentation system may have its own catalog of items for purchase, with corresponding images of associated objects that may appear in media content. The media-presentation system (e.g., a computing system at the media-presentation device or elsewhere) could then process these various images, applying image embedding or the like, and could use the images to train a neural network or other such image-recognition engine. When a user triggers the present process or if the media-presentation system triggers the process autonomously, the media-presentation system could then apply this image-recognition engine to identify images of objects in the media content and could proceed as noted above.

In an example implementation, upon user selection of an identified object in media content, the media-presentation system could select one or more purchase options, possibly based on predefined correlation data that correlates respective objects with associated purchase items, and possibly further based on consideration of user-profile data such as the user's past purchase history for instance. Further, if the media-presentation system selects multiple purchase items, the media-presentation system may prioritize the order of its presentation of those multiple purchase items, based on various factors also possibly considering the user-profile data.

For a given identified object, the media-presentation system could present purchase options in various ways on the media-presentation device that is presenting the media content. For example, the media-presentation device could superimpose a bounding box around a given identified object in the media content, and the media-presentation device could present next to that bounding box the purchase options available for the identified object. Alternatively, the media-presentation device could superimpose a listing of the purchase options on a side of the media content (e.g., on a left side, right side, etc., of a video frame), perhaps while also superimposing a bounding box around the given identified object in the media content. Still alternatively, as noted above, the media-presentation system could present purchase options in the form of ads within commercial breaks or the like.

In another implementation, the media-presentation system could cause the purchase options to be presented on a device that is not presenting the media content. For example, if the media-presentation system has information about a separate user device such as a mobile phone associated with a user of the media-presentation device, the media-presentation system could cause the purchase options to be presented on that separate user device. For instance, as the user is watching media content on the media-presentation device, when the user invokes a "scan for purchase" option or the like, the media-presentation system could evaluate a current frame of the media content in search of one or more objects having associated purchase options, and the media-presentation system could then send a message to the separate user device to cause the user device to present the purchase options. Without limitation, for instance, the media-presentation system may send such a message to the user device as a multimedia messaging system (MMS) message containing one or more actionable links that the user could select to process a purchase.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

The present disclosure will focus on an example implementation in the context of an OTT media-presentation system, in which a virtual MVPD streams media content such as various OTT channels on demand to a media player at customer premises and the media player outputs the media content for presentation on a TV or other multi-media user interface. It should be understood, however, that the disclosed principles could extend to apply in other scenarios as well. For instance, the disclosed principles could apply with respect to a cable or satellite TV content feed, a video gaming system, a standalone client-based media player, and other arrangements.

Figure 1:
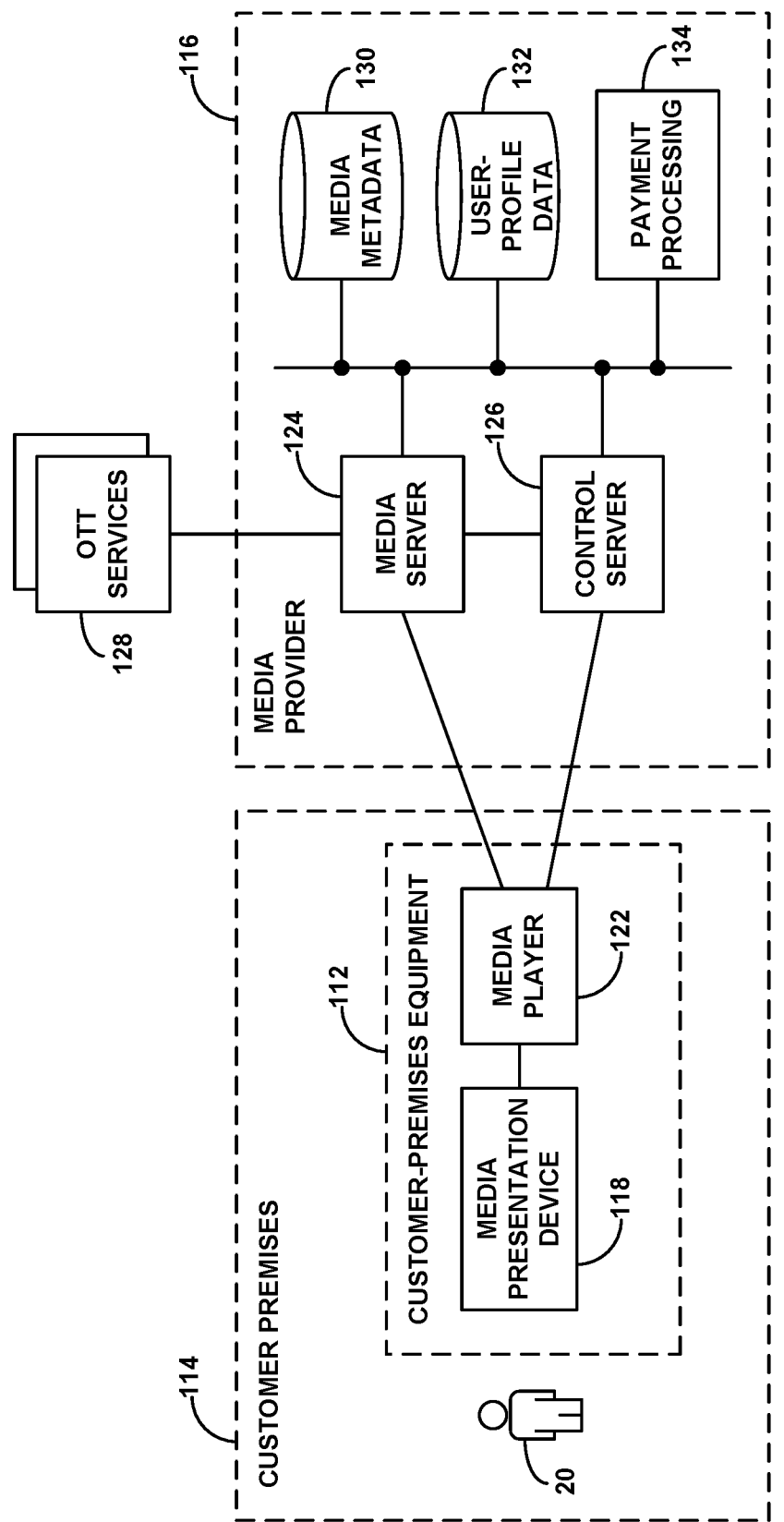
FIG. 1 is a simplified block diagram of an example media-presentation system.

Referring to the drawings, FIG. 1 is a simplified block diagram of an example media-presentation system. In line with the discussion above, the example media-presentation system includes customer-premises equipment 112 located at customer premises 114 such as a home, and a network based media provider 116 configured to provide the customer-premises equipment 112 with media content for presentation.

In the example arrangement, the customer-premises equipment 112 includes a media-presentation device 118 such a TV or other user-interface device configured to present media content to one or more users such as example user 120. Further, the customer-premises equipment 112 includes a media player 122, such as an OTT device, configured to receive streaming media content and to provide the media content to the media-presentation device 118 for presentation. In various implementations, the media player 122 could be provided as a standalone device connected with the media-presentation device 118 by a High Definition Multimedia Interface (HDMI) cable or other wired or wireless connection or could be integrated within the media-presentation device 118 or provided in another manner.

The example network-based media provider 116 then includes a media server 124 configured to stream media content on demand to user devices such as customer-premises equipment 112 and includes a control server 126 configured to control the streaming. The media provider 116 could be configured to obtain much of this content on demand from various OTT services 128 and to serve or proxy that media content to the customer-premises equipment for presentation.

In an example implementation, the media player 122 could be in network communication with both the media server 124 and the control server 126, to facilitate interacting with the media provider 116 to receive information about available media content, and to request and receive streaming media content for presentation on the media-presentation device 118. For instance, the media player 122 could have local area network (LAN) connectivity at the customer premises 114, the customer premises 114 could have a router and modem (not shown) with an assigned public Internet Protocol (IP) address on the Internet, and the media server 124 and control server 126 could be accessible at respective public IP addresses as well. Alternatively, the media player 122 could have virtual private network (VPN) connectivity with the media server 124 and control server 126, among other possibilities.

Streaming of media content from the media server 24 to the media player 22 could operate according to any of a variety of well-known adaptive bit-rate streaming protocols, such as Dynamic Adaptive Streaming over Hypertext Transfer Protocol (HTTP) (DASH), HTTP Live Streaming (HLS), or Smooth Streaming Transport Protocol (SSTP), among other possibilities. As the details of these streaming protocols are known, they will not be described here.

In the example implementation, the media provider 116 could include or otherwise have access to various data and platforms to facilitate providing streaming media services to users such as a user 120. As shown, for instance, the media provider 116 could have access to media metadata 130, user-profile data 132, and a payment processing system 134. The media metadata 130 could include a variety of information regarding each of various media-content items available for streaming, such as title, duration, genre, production staff, menu graphics, and ratings, among other possibilities. The user-profile data 132 could include profile records for users and associated customer-premises equipment configured to receive streaming media service provided by the media provider 116, such as user name, equipment location, user-payment information (e.g., credit card information), and mobile phone number if applicable. And the payment processing system 134 could be configured to securely interact with a commercial payment processing platform (e.g., a credit-card service) (not shown) and with a user such as the user 120, to enable the media provider 116 to process user payments for media streaming and/or other services.

As discussed above, the present disclosure provides for interrelating media content with purchasable items, where the purchasable items could be goods or services related to objects depicted by the media content. In particular, while a user is viewing content on a media-presentation device (e.g., a TV, personal computer, etc.) of a media-presentation system, the media presentation system may enable the user to purchase goods or services related to objects that appear in that media content.

Figure 2:
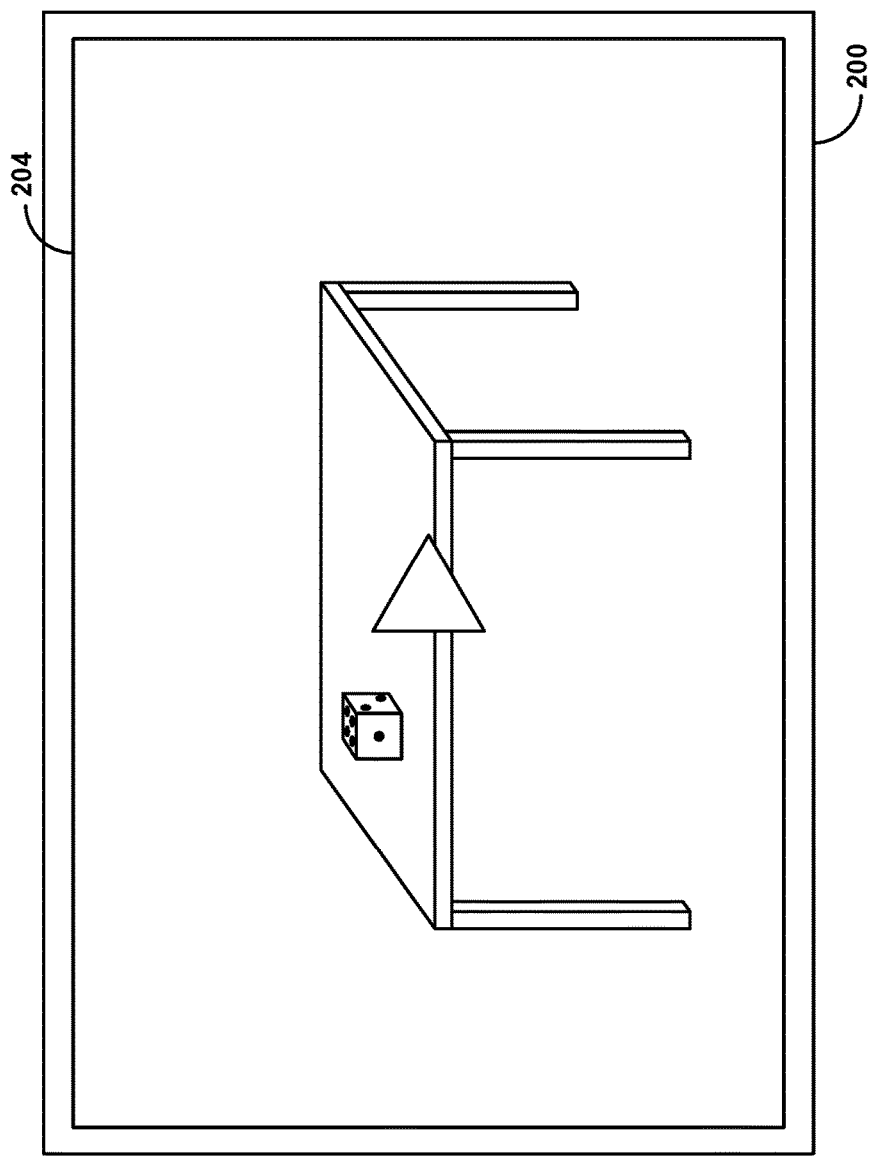
FIG. 2 is a simplified illustration of a scenario where a user interacts with content being presented at a media-presentation device.
Figure 2:
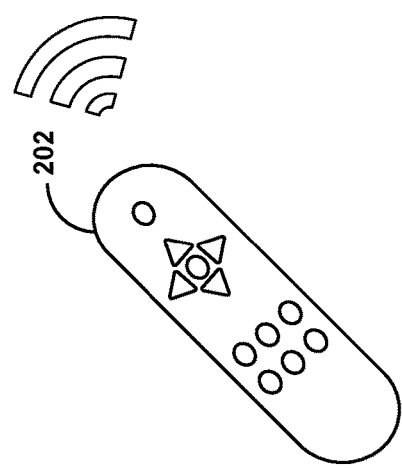

FIG. 2 is a simplified illustration of a scenario where a user interacts with content being presented at a media-presentation device, illustrating an example scenario where interaction with content being presented at a media-presentation device could trigger a process to relate the content with various purchasable items. In particular, the figure illustrates media-presentation device 200, which could be a TV, a TV connected to a set top box, or a smart TV with an integrated media player, among other possibilities. The media-presentation device 200 could present a video stream including a sequence of video frames. For instance, the media-presentation device 200 could receive that video stream through a media player interconnected or included with the media-presentation device 200, and the media-presentation device 200 could then output the video stream for presentation.

As the media-presentation device 200 receives a particular video stream from the media player and displays the particular video stream to a user, the user could use a remote control 202 to interact with the displayed content to cause media-presentation device 200 to perform various operations. For example, the user could use the remote control 202 to pause the current video stream at a particular video frame and interact with elements of a graphical user interface (GUI) (e.g., prompts, buttons, etc.) that are presented by the media-presentation device 200.

Additionally or alternatively, the user could make use of devices other than the remote control 202, e.g., a laptop, phone, or other user device, to interact with the media-presentation device 200. The user device may be connected to the media-presentation device and other devices in the media-presentation system via a local network, BLUETOOTH, or other connection method. And the user could use the user device, perhaps through an application installed on the user device, to pause the video stream being presented by the media-presentation device 200 or to interact with elements of the GUI being presented by media-presentation device 200. For example, the user device could be presenting a GUI of a streaming service and the media-presentation device 200 could also be presenting a GUI of the same streaming service. The user could interact with the GUI of the streaming service through their user device, and the user device could respond to those user interactions (e.g., and the media-presentation device 200 could select a show, pause a video stream, fast forward the video stream, etc.). The user device could send an indication of these interactions to the media-presentation device 200, which could then mirror those user interactions. For example, if a user uses their user device to pause playback of a video stream on their user device, then the media-presentation device 200 may also pause playback of the video stream.

In an example implementation, one option provided by the remote control 202 and/or by the presented GUI could be a "scan for purchase" option (by this or other names), which the user could select to invoke the present process. While the media-presentation device 200 is presenting a video stream, the media-presentation device 200 could detect user invocation of that "scan for purchase" option and could then responsively pause playout of the video at a video frame being presented, e.g., at video frame 204. The media-presentation system could then responsively evaluate that paused video frame 204 to identify one or more objects depicted in the video frame 204 and could associate each such identified object with one or more purchase options. And the media-presentation system could then present the user with one or more associated purchase options, receive a user selection of one or more desired purchase options, and process one or more associated purchases.

Figure 3:
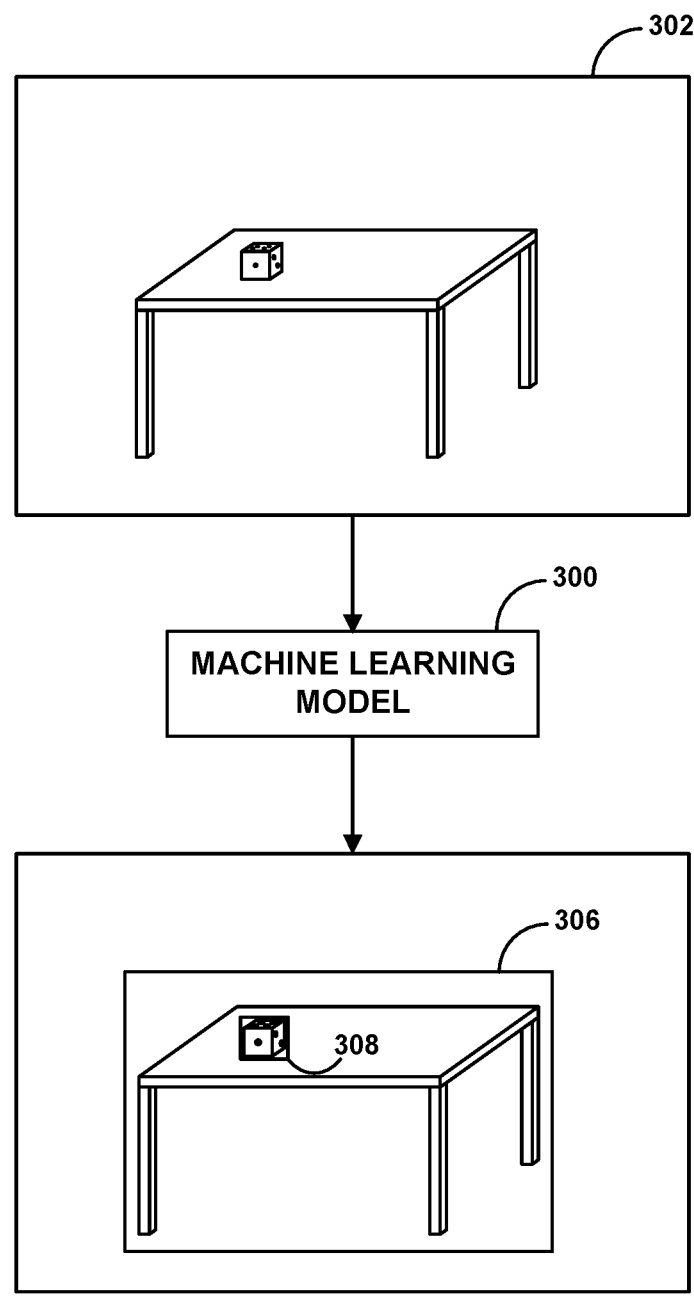
FIG. 3 is a simplified block diagram illustrating functions of an example object detection process.

As mentioned above, this process could involve applying a machine-learning process to the video frame (i) to detect one or more objects being depicted by the video frame and (ii) to correlate the detected objects with one or more purchasable items. FIGS. 3 and 4 help to illustrate this process.

FIG. 3 is a simplified block diagram illustrating functions of an example object detection process. The example object detection process shown in FIG. 3 involves a representative video frame 302, which could be a video frame at which the media-presentation device 200 paused video presentation in response to detecting a user's "scan for purchase" request or the like.

As shown in FIG. 3, the media-presentation system could apply a machine-learning model 300 to the video frame 302 to determine areas in video frame 304 that contain an object. In particular, using the machine-learning model 300, the media-presentation system could predict coordinates at which an object is present, e.g., as shown by an example bounding box 306 and another example bounding box 308.

Before the media-presentation system applies the machine-learning model 300 to a video frame, a computing device, perhaps of the media-presentation system, could train the machine-learning model using one or more datasets to enable the machine-learning model 300 to output reasonably accurate predictions. In particular, the machine-learning model 300 may have weights, biases, and other trainable parameters, and the computing system may adjust the value of each trainable parameter so that the machine-learning model 300 will be able to output an accurate prediction. For example, the machine-learning model 300 could be an artificial neural network with various layers each representing operations that can be applied to inputted data. Each layer could have multiple nodes, and at each node, the computing system training the artificial neural network could multiply the input data by a weight, add a bias, and send result to the next layer of the model.

To facilitate training of the machine-learning model 300, the computing device could use a dataset that includes various pictures where each picture is labeled with bounding boxes of areas where objects are present. The training dataset could indicate the location of the bounding boxes using coordinates relative to the video frame (e.g., relative to a corner of the video frame). During training, the computing device could input the pictures into the machine-learning model 300 to predict bounding boxes corresponding with each picture and could use the labels of bounding boxes to adjust the weight values of the model. Specifically, the computing device could apply a loss function to determine an error between the predicted labels and the actual labels, and the computing device could adjust the weight values through backpropagation, to minimize this loss.

After training the machine-learning model 300, the computing device could then store the trained machine-learning model 300 and/or could send the trained machine-learning model 300 to another entity of the media-presentation system for storage and use.

Using the trained machine-learning model 300, the media-presentation system may generate various bounding box predictions for a video frame in response to user invocation of a "scan for purchase" option when that video frame is being presented (e.g., when the video frame is currently being presented or has just been presented or the like). For instance, the media-presentation system may input the video frame 302 into the trained machine-learning model 300 to obtain a set of coordinates corresponding with predicted bounding boxes 306 and 308 as shown in FIG. 3. For each predicted bounding box, the set of coordinates could include four pairs of coordinates, each pair representing a corner of the predicted bounding boxes relative to the pixels of video frame 302. These predicted bounding boxes 306 and 308, perhaps as indicated by the set of coordinates, could thus indicate areas where the system has identified the presence of one or more objects in the video frame.

Additionally or alternatively, the media-presentation system could use the trained machine-learning model in advance of presentation of the video frame 302, perhaps in advance of presentation of the video stream as a whole, to predict and store data representing one or more such bounding boxes respectively as to one or objects in the video frame 302. For example, at some point before receiving user input to pause presentation of the video stream, the media-presentation system could determine that the video frame 302 has already been presented at least a predefined threshold number of times and could then respond to that determination by applying the process noted above to determine a set of coordinates for each object detected through application of the trained machine-learning model to the video frame 302. And upon user invocation of the "scan for purchase" option while that video frame 302 is being presented, the media-presentation system could then retrieve from memory the data representing the one or more bounding boxes as to that video frame 302. In an example implementation, the media-presentation system could carry out this or another such advanced establishment of bounding boxes for various video frames of a video stream in response to the media-presentation system having determined that the video stream has been presented at least a predefined threshold number of times (e.g., that the video stream is sufficiently popular and/or likely to be presented, to justify this advanced processing.) Establishing bounding boxes in advance may help to save time and computing resources, while expediting presentation of purchase options in line with the present method.

Regardless of how the media-presentation system determines or establishes predicted bounding boxes 306 and 308 for instance, the media-presentation system could use these predicted bounding boxes 306 and 308 as a basis to correlate each bounded object with one or more purchasable items. For instance, the media-presentation system could crop the video frame 302 to only include the region within a given bounding box and could apply a machine-learning model to the cropped video frame 302 as a basis to facilitate identifying or selecting one or more associated purchasable items.

The media-presentation system could employ various machine-learning methods, including unsupervised and supervised machine-learning methods, to compare the extracted video frame region with one or more stored object images to determine one or more purchasable items to recommend to the user. Unsupervised machine-learning methods may include various methods of separating and grouping data (e.g., stored object images representative of a purchasable item) without the need of labeled data. Supervised machine-learning methods may include various methods of separating and grouping data using labeled data.

In an example implementation, the media-presentation system could employ a Siamese network, which could be a supervised machine-learning method involving a machine-learning model. The machine-learning model could include two sub-networks, where the media-presentation system or other computing system could concurrently input an image (e.g., the stored object images or the extracted video frame region) to each sub-network and output a distance between the two input images. The machine-learning model could also include other sub-networks to facilitate predicting an accurate distance between the two input images.

Figure 4A:
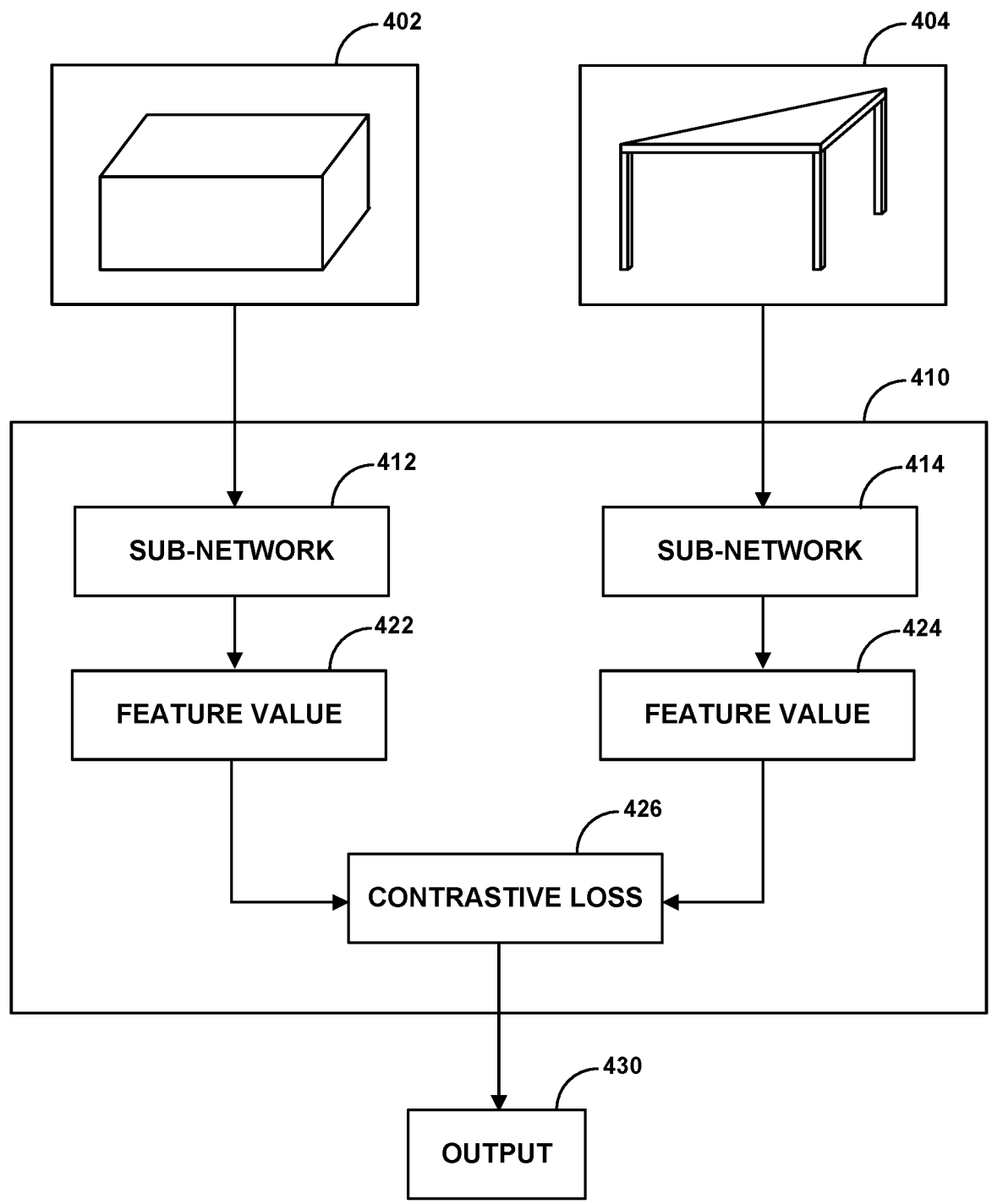
FIG. 4A is a simplified block diagram illustrating functions of an example correlation process to relate detected objects to purchasable items.
Figure 4B:
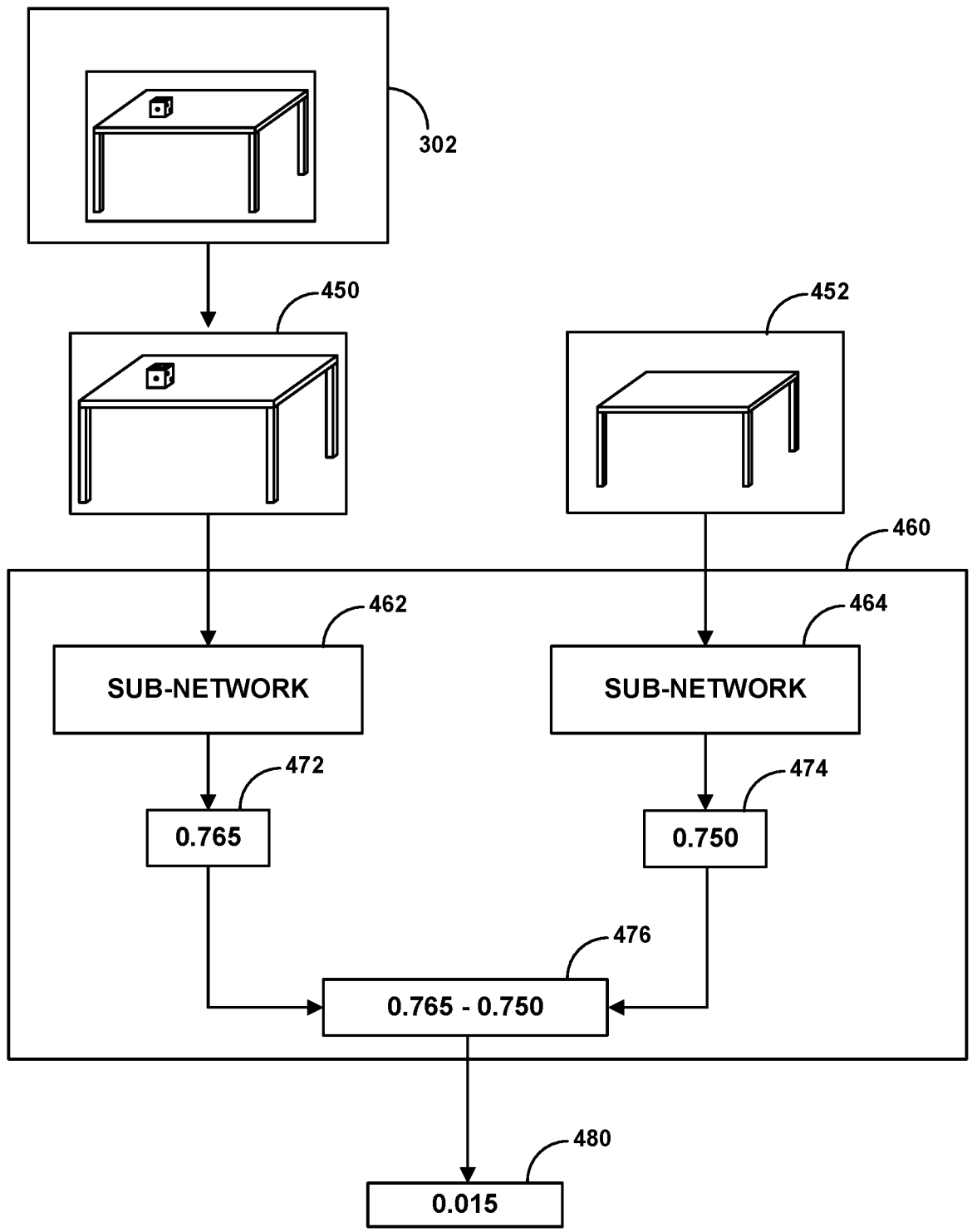
FIG. 4B is another simplified block diagram illustrating functions of an example correlation process to relate detected objects to purchasable items.

FIG. 4A and FIG. 4B are simplified block diagrams illustrating an example correlation process to relate the detected objects to various purchasable items using a Siamese network. Specifically, FIG. 4A illustrates training of a machine-learning model 410, and FIG. 4B illustrates application of the trained machine-learning model 460. The machine-learning model 410 and the trained machine-learning model 460 used in this process could be different, in terms of architecture and/or values of trainable parameters, than the machine-learning model 300 used in the example object detection process described above, or could be the same.

To facilitate the training process, a computing device, perhaps of the media-presentation system, could apply the machine-learning model 410 to a training dataset including various pairs of images known to be similar or not similar to each other. For example, a pair of images from the dataset could include a pair of images of round dining tables, which could be associated with labels indicating that the two images are similar. In contrast, a pair of images where one image is of a chair and another is of a dining table could be associated with labels indicating that the two images are not similar. This dataset may include one or more pre-determined datasets, and could include labels determined by humans and/or other computing devices.

In an example implementation, the computing device could train the machine-learning model 410 in a manner similar to the method described above, by adjusting weight values and other trainable parameters through backpropagation and based on the training dataset, in order to minimize a loss function. The machine-learning model 410 depicted in FIG. 4A includes sub-network 412 and 412, which could be two neural networks that the machine-learning model 410 can train in parallel. Each neural network could have the same architecture, and the computing device could update the trainable parameters of both sub-networks 412, 414 concurrently such that the trainable parameters of both models could have the same values. As shown in FIG. 4A, these sub-networks 412, 414 could simultaneously take respective input images 402, 404 and could output respective feature values 422 and 424.

The computing device could train the sub-networks 412, 414 to output feature values that are distant from each other when the input images are different than each other and close to each other when the input images are similar to each other. The feature values could thus be a representations of the input images as determined by the machine-learning model 410, such that the feature values are more distant from each other when the input images are more dissimilar and are closer to each other when the input images are more similar. The feature values could thereby facilitate making a prediction of whether images of an input pair are similar or not. As to the actual representation of the feature values outputted by the machine-learning model 410, the feature values could be numbers, matrixes, tensors, vectors, or other numerical representations and/or data structures.

The computing device could use a loss function, e.g., contrastive loss function 426, to determine how accurate the prediction is compared with the label indicating how similar or dissimilar the input images are, and to facilitate adjusting the trainable parameters of the machine-learning model 410 based on that determination. Using a contrastive loss function 426 could involve performing a distance calculation (e.g., a Euclidian distance calculation and/or a cosine similarity calculation) between the predicted feature values. The computing device may use the calculated loss as a basis to update the weights and other trainable parameters of the sub-networks 412, 414 to help the machine-learning model 410 output an accurate prediction of whether pairs of input images are similar or not (or to otherwise gauge their level of similarity). For example, if the pair of images, e.g., images 402, 404, are labeled as similar, then the computing device may adjust the weights and other trainable parameters of the machine-learning model 410 to minimize the predicted distance. Whereas, if the images are labeled as different, then the computing device may attempt to maximize the computed distance by adjusting the weights and other trainable parameters of the machine-learning model 410.

The computing device could compare the prediction with the label corresponding with the pair of images and adjust the weight values and other trainable parameters of the machine-learning model 410 based on the comparison. When the computing device computes this adjustment for various images of the dataset and for multiple times over the dataset, the computing device could establish a trained machine-learning model that accurately predicts whether pairs of images are similar or not similar.

After the computing device finishes training the machine-learning model 410, the computing device could store the trained machine-learning model in various ways, and the media-presentation system could retrieve the machine-learning model in various ways. The computing device could store the entire architecture of the trained machine-learning model (e.g., sub-network 412, 414, and the values of the trainable parameters of the machine-learning model 410) on the server, and the media-presentation system could retrieve the trained machine-learning model for use on correlating the object image. Additionally or alternatively, the computing device could store only the architecture and values of the trainable parameters of one of the sub-networks 412, 414. The media-presentation system could retrieve the trained sub-network and, based on the trained sub-network, determine a machine-learning model having the same architecture as machine-learning model 410. Further, the computing device could only store the values of the trainable parameters of the sub-networks 412, 414, and the media-presentation system could apply the values of the trainable parameters to a machine-learning model having the same architecture of machine-learning model 410.

FIG. 4B next helps illustrate that the media-presentation system could use such a trained machine-learning model as a basis to correlate an object image detected in a representative video frame with a stored object image, i.e., as a basis to determine or predict that the object image in the video frame is likely an image of the same object as the stored object image. Each such stored object image could be associated with one or more purchasable items (e.g., goods or services), perhaps through a stored mapping that correlates a stored object image with one or more such purchasable items. Thus, by correlating an object image detected in a representative video frame with a given stored object image, the media-presentation system could also correlate the detected object image with one or more purchasable items, to facilitate then presenting the user with an offer to purchase the one or more purchasable items.

To correlate an image of an object in a video frame with a stored object image, the media-presentation system could first extract the video frame region that contains the object image. As mentioned above, the media-presentation system could use a machine-learning model to determine coordinates that correspond to a region within the video frame 302 that is predicted to depict an object. The media-presentation system could then use these determined coordinates to extract the video frame region, e.g., the extracted video frame region 450.

In order to gauge image similarity between the extracted video frame region 450 and a given stored object image, the media-presentation system could input the extracted video frame region 450 and the stored object image 452 into trained machine-learning model 460. As mentioned above, the trained machine learning model 460 could be of the same architecture as machine-learning model 410, and the values of the trainable parameters could be determined through the training process described above. For example, the trained machine-learning model 460 could include sub-networks 462, 464, which could be of the same architecture as the sub-networks 412, 414 of machine-learning model 410 and the values of the trainable parameters of the sub-networks 462, 464 could be determined through the training process described above.

The media-presentation system could concurrently input (i) the extracted video frame region 450 into the sub-network 462 and (ii) the stored object image 452 into the sub-network 464. By inputting the extracted video frame region 450 and the stored object image 452 into the sub-networks 462, 464, the media-presentation system could obtain feature value 472 and feature value 474, respectively. In line with the discussion above, these feature values 472, 474 could be numbers, matrices, tensors, or other numerical representations and/or data structures. The media-presentation system could then calculate the distance between the feature value 472 and feature value 474 to obtain distance value 480. Without limitation, this distance calculation could comprise determining a cosine similarity measure or a Euclidian distance measure between the feature value 472 and the feature value 474.

In an example implementation, the media-presentation system could repeat this process for various stored object images to determine various distance values, and based on the various distance values, the media-presentation system could determine which stored object image is most similar to the extracted object image. In particular, the media-presentation system could select a stored object image based on the feature value of the stored object image being a relatively short distance or the shortest distance away from the feature value of the extracted video frame region 450 (e.g., that the feature value of the stored object image is closer in distance to the feature value of the extracted video frame region 450 than the feature values of one or more other stored object images, and perhaps that, among the feature values of various stored object images, the feature value of the stored object image is the closest in distance to the feature value of the extracted video frame region 450).

To facilitate this process of determining the stored object images that are associated with the feature values having relatively short or the shortest distance values from the feature values of the extracted video frame region 450, the media-presentation system could calculate the feature values of each of the stored object images in advance. For instance, the media-presentation system could apply one of the sub-networks 462, 464 to each of the stored object images in advance, to determine a feature value for each of the stored object images. The media-presentation system could then store these feature values for later reference. In turn, after determining a feature value for an extracted video frame region, the media-presentation system could then determine the distance respectively between the determined feature value of the extracted video frame region and the predetermined feature value of each of the stored object images. Additionally or alternatively, the media-presentation system could select a few of the stored object images based on the select few having feature values that are likely to be closest to the feature values of the extracted video frame. The media-presentation system could then determine the distance between (i) the feature value of the extracted video frame region and (ii) each of the feature values of the select few of the stored object images, and select one or more of the select few stored object images that have feature values closest in distance to the feature value of the extracted video frame region 450.

Using multiple machine-learning models, e.g., machine-learning model 300 and 460, to help carry out this process could be advantageous compared with having a single machine-learning model carry out this process. Because the system uses machine-learning model 300 and 460 for different respective purposes (namely, using machine-learning model 300 to determine the coordinates of an object image within a video frame and using the machine-learning model 460 to relate that detected object image with various stored object images), if the system detects irregularities with either process or the results of either process, the system may simply retrain and/or replace the machine-learning model at fault without a need to retrain the other machine-learn model. For example, if the media-presentation system detects that machine-learning model 300 always outputs coordinates indicating the presence of an object in the corner of any given video frame, the media-presentation system may re-train machine-learning model 300 or replace machine-learning model 300 with a more accurate machine-learning model, without having to retrain or replace machine-learning model 460—thus possibly saving space, resources, and time.

After having selected the stored object images based on applying the trained machine-learning model 460, the media-presentation system could determine the corresponding purchasable items. As mentioned above, the media-presentation system could store a mapping that relates each stored object image to one or more purchasable items. The purchasable items mapped to a given stored object image could be goods and/or services related to the stored object image, such as an instance of the depicted object, a related object, or a related service, among other possibilities. The media-presentation system could thus use this mapping to determine one or more purchasable items corresponding with the stored object image that the system found to be similar to the object depicted in the video frame.

In some examples, the mapping could relate a stored object image to multiple purchasable items, and the purchasable items could have corresponding data (e.g., vendors, price, etc.), which the media-presentation system could use to select one or more most appropriate purchasable items to suggest to the user.

Further, when selecting one or more purchasable items to suggest to the user, the media-presentation system could take into account various other factors, such as a profile of a user. For example, the media-presentation system may determine by reference to user-profile data 132 (e.g., shopping history data) that the user prefers shopping at a particular website. Given that preference, the media-presentation system may give more weight to selection of a purchasable item that is purchasable at that website than to purchasable items that are purchasable only elsewhere. Various other examples could be possible as well, for instance based on factors such as user preference to shop at small businesses, to shop for items of particular price ranges, or the like.

Further, the media-presentation system may use this or other such preference data when selecting a stored object image that would map to one or more purchasable items in the first place. For instance, given a first stored object image that the system determines is most similar to the extracted video frame region and a second stored object image that the system determines is second-most similar to the extracted video frame region, the system may select the second stored object image rather than the first stored object image if the mapping data correlates the second stored object image with one or more purchasable items available from a website that the user prefers and the mapping data correlate the first stored object image with one or more purchasable items available from just one or more sources other than that website.

In addition, the media-presentation system may provide the user with a configuration GUI through which the user can expressly block one or more vendors, label one or more vendors as preferred, and/or provide one or more other user preferences that the media-presentation system could then factor into its selection of what purchasable items should be the subject of a purchase prompt.

Figure 5:
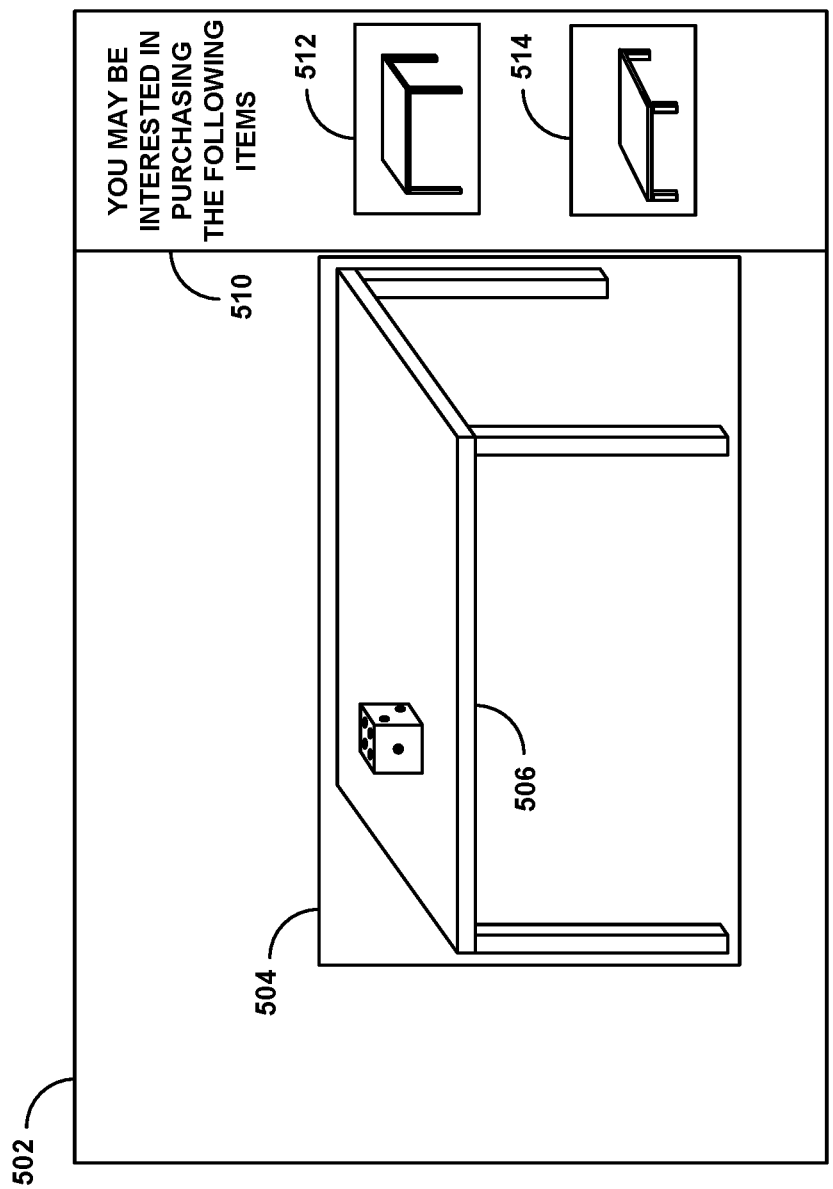
FIG. 5 illustrates prompts for purchasing the purchasable items.

After determining one or more purchasable items related to a stored object image similar to a detected object of the video frame, the media-presentation system could then present or cause presentation of a purchase prompt, to prompt the user to purchase one or more such items. FIG. 5 illustrates an examples such a prompt. The example in FIG. 5 assumes that the media-presentation system has identified the presence of object 506 in a representative video frame 502, possibly using the machine-learning process noted above in response to the user invoking a "scan for purchase" option. As shown in FIG. 5, the media-presentation system (e.g., media presentation device or media server) could superimpose presentation of a bounding box 504 around that identified object 506, and the media-presentation system could present a listing 510 of one or more associated purchasable items at a side of the video frame 502. Example listing 510 could include prompts 512 and 514 for the purchase of respective items that the media-presentation system determined to relate to the identified object in bounding box 504 in the video frame 502—e.g., that the mapping data correlates with a stored object image that the system found to be most similar to the image in the video frame.

Example listing 510 could include one or more items and could list the items in various orders and in various ways. For example, if the listing 510 includes more than one purchasable item, the media-presentation system could order presentation of the items, and thus the associated purchase prompts, based on their respective calculated distances between feature values as discussed above, possibly listing items with closer distances earlier in the list. Further, rather than superimposing this listing at a side of the video frame 502 as shown, the media-presentation device could superimpose one or more prompts next to bounding box 504 elsewhere in the video frame 502. Additionally or alternatively, the media-presentation system could send the one or more prompts to a user device, e.g., a mobile phone, for presentation to the user, and the user device could present a listing of the purchasable items, perhaps as a webpage, as an application, or superimposed on a video stream also being presented at the user device. Other approaches could be possible as well.

Once the media-presentation system has presented or caused presentation of one or more such purchase prompts to the user, the media-presentation could then receive user input to select one or more purchasable items and could responsively process a user purchase or the one or more of the purchasable items. For example, the user may use the remote control 202 in communication with the media-presentation device 200 to select (e.g., click) at least one desired purchasable item from the one or more listed, which could trigger signaling to the media-presentation system to initiate purchase of that item.

Regardless of whether the purchase prompt is presented by the media-presentation device 200 or by a separate user device, user selection of a desired purchasable items from one or more listed purchasable items may trigger associated signaling to a payment processing system 134 of the media-presentation device 200. The payment processing subsystem may then process a purchase of the selected item on behalf of the user, perhaps by interacting with a commercial payment processing platform to enable the media-presentation system to process payment by the user.

To facilitate payment processing, the media-presentation system could transmit a purchase request to a vendor associated with the purchasable item. The purchase request could include user-payment information (e.g., name, credit card number, billing address, etc.), among other personal information (e.g., shipping address, email, etc.). To facilitate this process, the media-presentation system could retrieve user-profile data, which could contain user-payment information along with other personal information. The media-presentation system could present this stored user-payment information for the user to verify and/or update and the media-presentation system could transmit the information to the vendor, perhaps through use of the vendor's or another third-party's application programming interface (API).

Specifically, the media-presentation system could employ the control server 126 of the media provider 116 to retrieve, verify, and transmit the user-payment information. As mentioned above, the media provider 116 may include the control server 126 and may have access to user-profile data 132. The control server 126 could retrieve user-payment information from user-profile data 132 and verify the user-payment information with the user. The control server 126 could then send the user-payment information to the payment processing system 134. The payment processing system 134 could then transmit a purchase request including the user-payment information to the vendor for processing. In response to this transmitting, the payment processing system 134 could then receive a confirmation from the vendor that the vendor received the user-payment information.

In some examples, as suggested above, the process of facilitating user purchases of goods or services related to objects appearing in a video frame could involve presenting targeted advertising to the user, perhaps instead of presenting an express purchase prompt as noted above. For instance, based on the presence in a video frame of a particular object image, the media-presentation system may identify an associated purchasable item in a manner similar to that discussed above, and the media-presentation system may then invoke a process to dynamically insert into the video stream an advertisement for that purchasable item.

In practice, the media-presentation system may carry out this dynamic ad insertion process as to video being watched by a user without a need for the user to engage a "scan to purchase" option or the like. For instance, based on historical data indicating that users watching the same video tend to pause the video at a given video frame, the system may analyze that particular video frame to identify a purchasable item related to an object in that video frame and may therefore invoke dynamic ad insertion to present an ad for that purchasable item. Alternatively or additionally, the system may otherwise analyze each frame of the video to carry out this process and may, for instance, identify an object that appears many times and may therefore invoke dynamic ad insertion to insert an ad for an item related to that object. Other approaches could be possible as well.

This dynamic ad insertion process could take various forms. Without limitation, for instance, the media-presentation system could select a targeted ad and could splice that ad into the video stream in place of another ad that exists in the video stream, or the media-presentation system could insert an additional ad into the video stream where an ad break did not previously exist in the stream, among other possibilities. Further, where the system engages dynamic ad insertion to present an advertisement for an item related to an object image detected in a video frame, the system could present that advertisement close in time to that video frame, i.e., based on a determination that the time of presentation of the advertisement is threshold close in time to the time of the video frame where the object image was detected.

In addition, when presenting a replacement ad in line with this process, the media-presentation system may overlay on the ad a prompt for the purchase of the advertised purchasable item. For example, the media-presentation system could superimpose text on the advertisement stating "see details," "purchase now," or among other examples. The media-presentation system could then receive user input and could present further information and/or process a purchase of the advertised item in a manner similar to that discussed above for instance.

Figure 6:
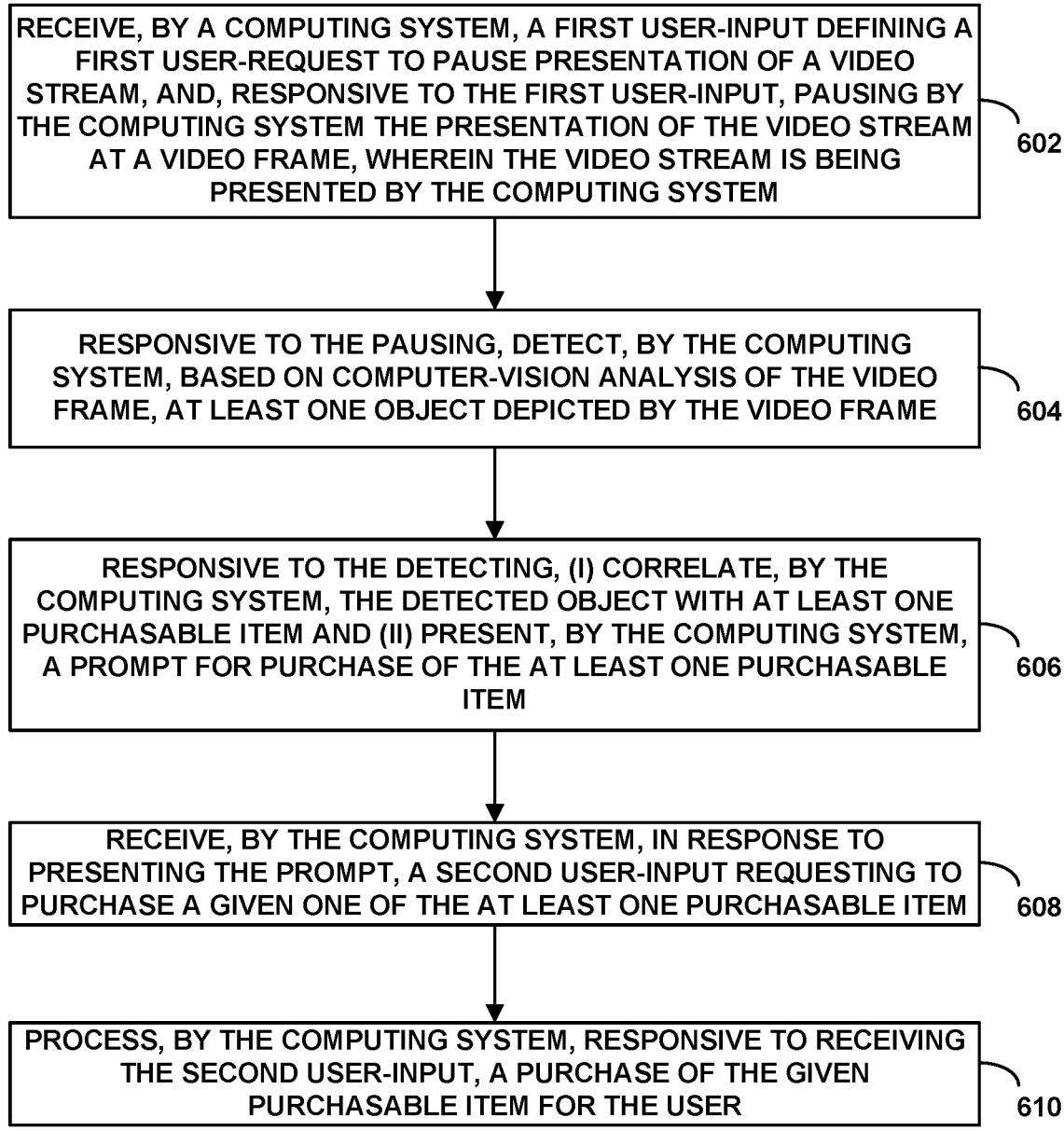
FIG. 6 is a flow chart depicting a method that can be carried out in accordance with the disclosure.

FIG. 6 is a flow chart depicting a method that can be carried out in accordance with the present disclosure. As shown in FIG. 6, at block 602, the method includes receiving, by the computing system, a first user-input defining a first user-request to pause presentation of the video stream, and, responsive to the first user-input, pausing by the computing system the presentation of the video stream at a video frame. Further, at block 604, the method includes responsive to the pausing, detecting, by the computing system, based on computer-vision analysis of the video frame, at least one object depicted by the video frame. Also, at block 606, the method includes, responsive to the detecting, (i) correlating, by the computing system, the detected object with at least one purchasable item and (ii) presenting, by the computing system, a prompt for purchase of the at least one purchasable item. Additionally, at block 608, the method includes receiving, by the computing system, in response to presenting the prompt, a second user-input requesting to purchase a given one of the at least one purchasable item. Further, at block 610, the method includes processing, by the computing system, responsive to receiving the second user-input, a purchase of the given purchasable item for the user.

In line with the discussion above, the act of detecting, based on computer-vision analysis of the video frame, the at least one object depicted by the video frame could involve detecting, based on computer-vision analysis of the video frame, a plurality of objects depicted by the video frame.

Additionally or alternatively, the act of detecting based on computer-vision analysis of the video frame, the object depicted by the video frame could include determining, based on applying a pre-trained machine-learning model to the video frame, a set of coordinates of the object in the video frame Further, the method could also involve, before receiving the first user-input defining the first user-request to pause the presentation of the video stream, engaging in an object detection process including (i) determining, based on applying a pre-trained machine-learning model to the video frame, a set of coordinates of the object in the video frame, and (ii) storing, in data storage, the set of coordinates of the object in the video frame. Detecting, based on computer-vision analysis of the video frame, the object depicted by the video frame could involve retrieving the set of coordinates of the object in the video frame.

The method could also include determining that the video stream has been presented at least a predefined threshold number of times, where engaging in the object detection process is responsive to the determining that the video stream has been presented at least the predefined threshold number of time.

Additionally, the act of detecting based on computer-vision analysis of the video frame, the object depicted by the video frame could comprise determining an identity of the video stream being presented, and based on data correlating the identity of the video stream being presented with a set of coordinates, receiving, from storage, the set of coordinates of the object in the video frame, where the set of coordinates was determined based on applying a pre-trained machine-learning model to the video frame of the video stream.

Further, the object could have a set of coordinates defining a location of the object within the video frame, where correlating the object with at least one purchasable item could involve (i) extracting an image region of the video frame based on the set of coordinates, (ii) determining, based on applying a pre-trained machine-learning model to the extracted image region, a feature value representative of the extracted image region, (iii) accessing a plurality of feature values each representative of a respective stored purchasable-item image of a plurality of stored object images, (iv) determining, based on the feature value of the extracted image region and each of the plurality of feature values, a plurality of similarity values, and (v) selecting, based on the plurality of similarity values, at least one stored object image from the plurality of stored object images based on the selected purchasable item having a highest similarity value, where the selected at least one stored object image corresponds to the at least one purchasable item.

In addition, the method could also include determining, by applying the pre-trained machine-learning model to the plurality of stored object images, the plurality of feature values.

Further, the act of detecting, based on computer-vision analysis of the video frame, the at least one object depicted by the video frame could involve applying a first pre-trained machine-learning model. And the act of correlating the detected object to the at least one purchasable item could involve applying a second pre-trained machine-learning model with an architecture different from the first pre-trained machine-learning model.

Additionally, the at least one purchasable item could be a plurality of purchasable items, and each purchasable item could be from a different vendor. Further, the act of presenting the prompt for purchase could involve listing the plurality of purchasable items in the prompt as user-selectable options for purchase.

Also, the object could have a set of coordinates of the object within the video frame, and the act of presenting the prompt for purchase of the at least one purchasable item could comprise superimposing, in the video frame, (i) a bounding box at the set of coordinates within the video frame, and (ii) a prompt for purchase of the at least one purchasable item.

In addition, the act of presenting the prompt for purchase of the at least one purchasable item could involve superimposing, in the video frame, a listing of the at least one purchasable item.

Further, correlating the detected object with the at least one purchasable item could be based on a profile of the user.

Still further, correlating the detected object with at least one purchasable item could be based on a price of each of the at least one purchasable item.

Figure 7:
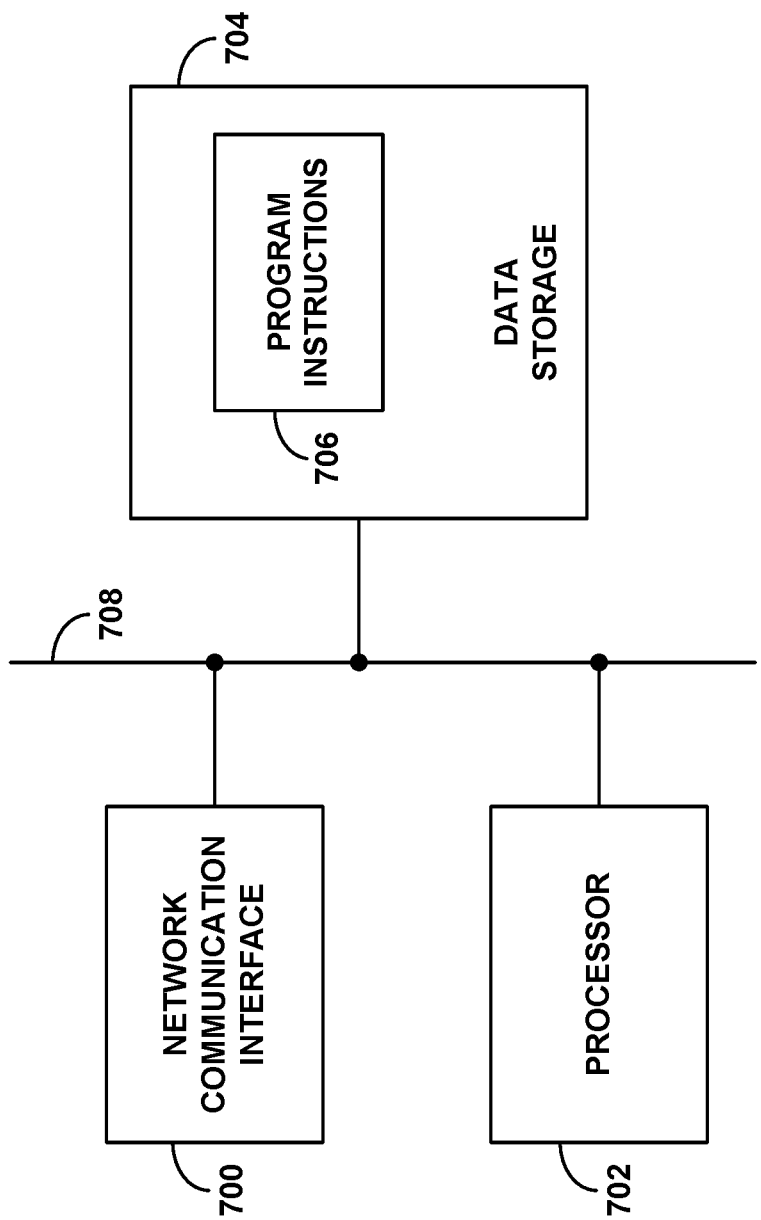
FIG. 7 is a simplified block diagram of an example system operable in accordance with the disclosure.

In addition, the computing system could be a provider of the media stream to the user, and the act of processing the purchase of the purchasable item for the user could include transmitting, from the computing system to a vendor associated with the purchasable item, a purchase request, where the purchase request includes user-payment information FIG. 7 is next a simplified block diagram of an example system operable in accordance with the present disclosure. This system could represent control server 26 as described above and/or one or more other components of or associated with a media presentation system, among other possibilities.

As shown in FIG. 7, the example system includes a network communication interface 700, a processor 702, and non-transitory data storage 704, any or all of which could be integrated together or, as shown, communicatively linked together by a system bus, network, or other connection mechanism 708.

The network communication interface 700 could comprise one or more physical network connection mechanisms to facilitate communication on a network, and/or for engaging in direct or networked communication with one or more other local or remote entities. As such, the network communication interface 700 could comprise a wireless or wired Ethernet interface or other type of network interface, for engaging in IP communication and/or other type of network communication.

Further, the processor 702 could comprise one or more general purpose processors (e.g., microprocessors) and/or one or more specialized processors (e.g., application specific integrated circuits). And the non-transitory data storage 704 could comprise one or more volatile and/or non-volatile storage components, such as optical, magnetic, or flash storage.

As shown, the data storage 704 of the example system could further store program instructions 706, which could be executable by the processor 702 to carry out various operations described herein. For instance, the operations could include (a) detecting an occurrence of a media-presentation event associated with presentation of a media-content item by the media presentation system, (b) responsive to detecting the media-presentation event, (i) presenting a food-ordering prompt that solicits user input to place a food order, (ii) receiving the user input responsive to the presented prompt, and (iii) responsive to the received user input, engaging in network communication through the network communication interface to place the food order pursuant to the received user input, and (c) using timing of presentation of the media-content item as a basis to schedule a pickup or delivery time for the food order.

Various features described herein could be implemented in this context as well, and vice versa.

Figure 8:
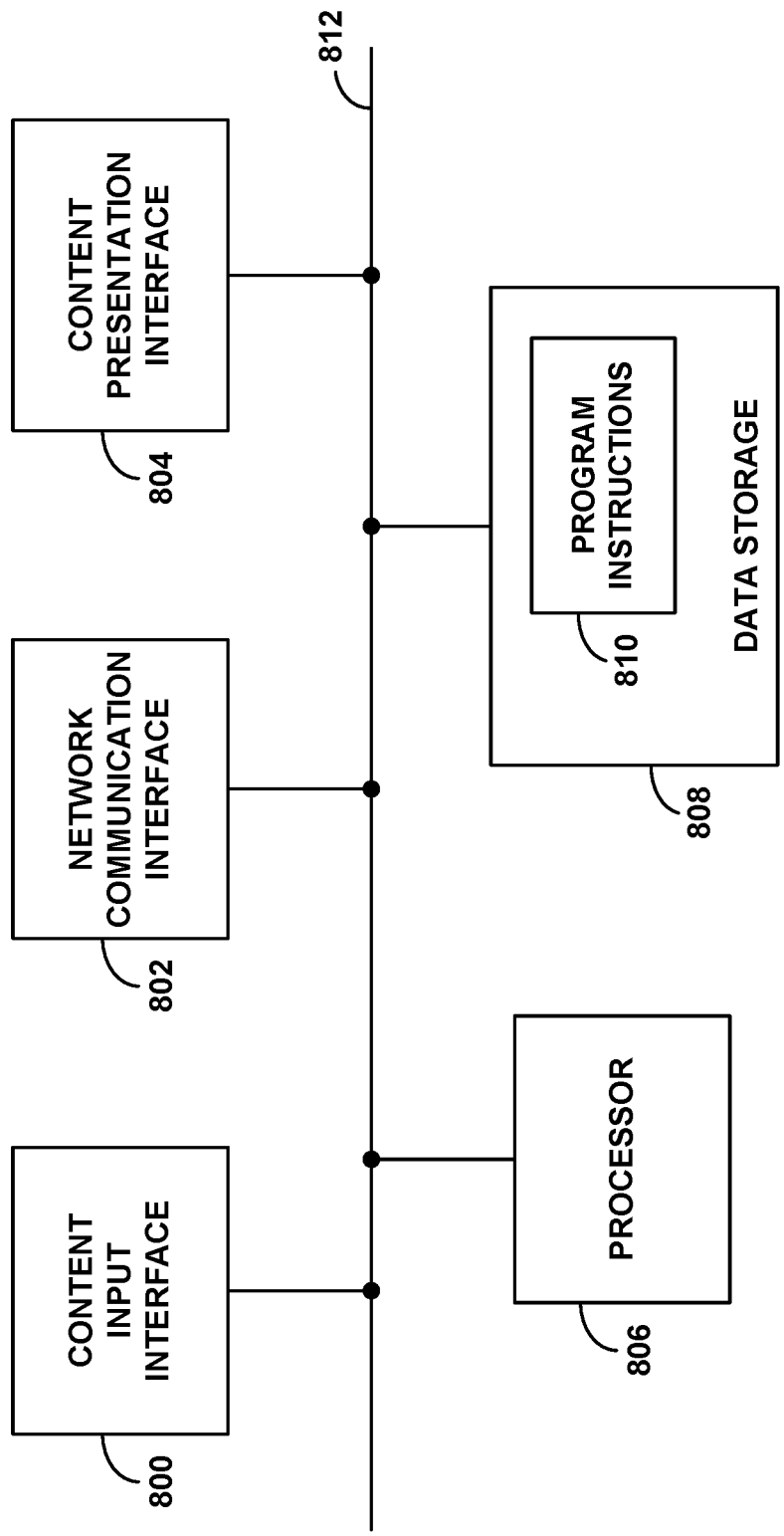
FIG. 8 is a simplified block diagram of example customer-premises equipment operable in accordance with the disclosure.

Finally, FIG. 8 is a simplified block diagram of example customer-premises equipment, including aspects of a media player and media presentation device as discussed above. As shown in FIG. 8, the example customer-premises equipment includes a content input interface 800, a network communication interface 802, a content presentation interface 804, a processor 806, and non-transitory data storage 808, any or all of which could be integrated together or, as shown, communicatively linked together by a system bus, network, or other connection mechanism 812.

Content input interface 800 could comprise a physical communication interface for receiving media content to be presented by the customer-premises equipment. As such, the content input interface 800 could include one or more wired and/or wireless interfaces for establishing communication with and receiving media content in analog or digital form from a media source. Network communication interface 802, which could be separate from or the same interface as the content input interface 800, could comprise a physical network connection mechanism to facilitate communication on a network, and/or for engaging in direct or networked communication with one or more other local or remote entities. These interfaces could comprise a wireless or wired Ethernet interface or other type of network interface, for engaging in IP communication and/or other type of network communication, among other possibilities.

Content presentation interface 804 could then comprise one or more components to facilitate presentation of the received media content. By way of example, the content presentation interface 804 could comprise a user interface such as a display screen and/or a loudspeaker, as well as one or more drivers or other components for processing the received media content to facilitate presentation of the content on the user interface.

Processor 806 could then comprise one or more general purpose processors (e.g., microprocessors) and/or one or more specialized processors (e.g., application specific integrated circuits). And non-transitory data storage 808 could comprise one or more volatile and/or non-volatile storage components, such as optical, magnetic, or flash storage. Further, as shown, data storage 808 could store stores program instructions 810, which could be executable by processor 80 to carry out various operations described here.

Various features described herein could be implemented in this context as well, and vice versa.

Further, the present disclosure also contemplates one or more non-transitory computer readable media encoded with, storing, or otherwise embodying program instructions executable by one or more processors to carry out various operations as described herein.

Exemplary embodiments have been described above. Those skilled in the art will understand, however, that changes and modifications may be made to these embodiments without departing from the true scope and spirit of the invention.

What is claimed is:

1. A method for processing a purchase based on image recognition in a video stream being presented by a computing system, the method comprising:
    receiving, by the computing system, a first user-input defining a first user-request to pause presentation of the video stream, and, responsive to the first user-input, pausing by the computing system the presentation of the video stream at a video frame;
    responsive to the pausing, detecting, by the computing system, based on computer-vision analysis of the video frame, at least one object depicted by the video frame, wherein detecting based on computer-vision analysis of the video frame the object depicted by the video frame comprises (a) determining an identity of the video stream being presented and (b) based on data correlating the identity of the video stream being presented with a set of coordinates of the object in the video frame, receiving, from data storage, the set of coordinates of the object in the video frame, wherein the set of coordinates was determined based on applying a pre-trained machine-learning model to the video frame of the video stream;
    responsive to the detecting, (i) correlating, by the computing system, the detected object with at least one purchasable item and (ii) presenting, by the computing system, a prompt for purchase of the at least one purchasable item;
    receiving, by the computing system, in response to presenting the prompt, a second user-input requesting to purchase a given one of the at least one purchasable item; and
    processing, by the computing system, responsive to receiving the second user-input, a purchase of the given purchasable item for the user.

2. The method of claim 1, wherein detecting, based on computer-vision analysis of the video frame, the at least one object depicted by the video frame comprises:

detecting, based on computer-vision analysis of the video frame, a plurality of objects depicted by the video frame.

3. The method of claim 1, wherein detecting based on computer-vision analysis of the video frame, the object depicted by the video frame comprises:
    determining, based on applying the pre-trained machine-learning model to the video frame, the set of coordinates of the object in the video frame.

4. The method of claim 1, wherein the method further comprises:
    before receiving the first user-input defining the first user-request to pause the presentation of the video stream, engaging in an object detection process including (i) determining, based on applying the pre-trained machine-learning model to the video frame, the set of coordinates of the object in the video frame, and (ii) storing, in the data storage, the set of coordinates of the object in the video frame.

5. The method of claim 4, wherein the method further comprises:
    determining that the video stream has been presented at least a predefined threshold number of times, wherein engaging in the object detection process is responsive to the determining that the video stream has been presented at least the predefined threshold number of times.

6. The method of claim 1, wherein the set of coordinates defines a location of the object within the video frame, wherein correlating the object with at least one purchasable item comprises:
    extracting an image region of the video frame based on the set of coordinates;
    determining, based on applying a further pre-trained machine-learning model to the extracted image region, a feature value representative of the extracted image region;
    accessing a plurality of feature values each representative of a respective stored purchasable-item image of a plurality of stored object images;
    determining, based on the feature value of the extracted image region and each of the plurality of feature values, a plurality of similarity values; and
    selecting, based on the plurality of values, at least one stored object image from the plurality of stored object images based on the selected purchasable item having a highest similarity value, wherein the selected at least one stored object image corresponds to the at least one purchasable item.

7. The method of claim 6, wherein the method further comprises:
    determining, by applying the further pre-trained machine-learning model to the plurality of stored object images, the plurality of feature values.

8. The method of claim 1, wherein the pre-trained machine-learning model is a first pre-trained machine-learning model, and wherein correlating the detected object to the at least one purchasable item comprises applying a second pre-trained machine-learning model with an architecture different from the first pre-trained machine-learning model.

9. The method of claim 1, wherein the at least one purchasable item is a plurality of purchasable items, wherein each purchasable item is from a different vendor, wherein presenting the prompt for purchase comprises listing the plurality of purchasable items in the prompt as user-selectable options for purchase.

10. The method of claim 1, wherein presenting the prompt for purchase of the at least one purchasable item comprises:
    superimposing, in the video frame, (i) a bounding box at the set of coordinates within the video frame, and (ii) a prompt for purchase of the at least one purchasable item.

11. The method of claim 1, wherein presenting the prompt for purchase of the at least one purchasable item comprises:
    superimposing, in the video frame, a listing of the at least one purchasable item.

12. The method of claim 1, wherein correlating the detected object with the at least one purchasable item is based on a profile of the user.

13. The method of claim 1, wherein correlating the detected object with at least one purchasable item is based on a price of each of the at least one purchasable item.

14. The method of claim 1, wherein the computing system is a provider of the video stream to the user, and wherein processing the purchase of the purchasable item for the user comprises transmitting, from the computing system to a vendor associated with the purchasable item, a purchase request, wherein the purchase request includes user-payment information.

15. A computing system comprising:
    a network communication interface;
    one or more processors;
    non-transitory data storage; and
    program instructions stored in the non-transitory data storage and executable by the one or more processors to carry out operations including:
        receiving a first user-input defining a first user-request to pause presentation of a video stream, and, responsive to the first user-input, pausing the presentation of the video stream at a video frame;
        responsive to the pausing, detecting based on computer-vision analysis of the video frame, at least one object depicted by the video frame, wherein detecting based on computer-vision analysis of the video frame the object depicted by the video frame comprises (a) determining an identity of the video stream being presented and (b) based on data correlating the identity of the video stream being presented with a set of coordinates of the object in the video frame, receiving, from the non-transitory data storage, the set of coordinates of the object in the video frame, wherein the set of coordinates was determined based on applying a pre-trained machine-learning model to the video frame of the video stream;
        responsive to the detecting, (i) correlating the detected object with at least one purchasable item and (ii) presenting a prompt for purchase of the at least one purchasable item;
        receiving, in response to presenting the prompt, a second user-input requesting to purchase a given one of the at least one purchasable item; and
        processing, responsive to receiving the second user-input, a purchase of the given purchasable item for the user.

16. The computing system of claim 15, wherein detecting, based on computer-vision analysis of the video frame, the at least one object depicted by the video frame comprises detecting, based on computer-vision analysis of the video frame, a plurality of objects depicted by the video frame.

17. The computing system of claim 15, wherein detecting based on computer-vision analysis of the video frame, the object depicted by the video frame comprises:

determining, based on applying the pre-trained machine-learning model to the video frame, the set of coordinates of the object in the video frame.

18. A non-transitory computer-readable medium having stored thereon program instructions executable by one or more processors to cause a media presentation system to carry out operations including:

receiving a first user-input defining a first user-request to pause presentation of a video stream, and, responsive to the first user-input, pausing the presentation of the video stream at a video frame;

responsive to the pausing, detecting based on computer-vision analysis of the video frame, at least one object depicted by the video frame, wherein detecting based on computer-vision analysis of the video frame the object depicted by the video frame comprises (a) determining an identity of the video stream being presented and (b) based on data correlating the identity of the video stream being presented with a set of coordinates of the object in the video frame, receiving, from data storage, the set of coordinates of the object in the video frame, wherein the set of coordinates was determined based on applying a pre-trained machine-learning model to the video frame of the video stream;

responsive to the detecting, (i) correlating the detected object with at least one purchasable item and (ii) presenting a prompt for purchase of the at least one purchasable item;

receiving in response to presenting the prompt, a second user-input requesting to purchase a given one of the at least one purchasable item; and processing responsive to receiving the second user-input, a purchase of the given purchasable item for the user.

19. The non-transitory computer-readable medium of claim 17, wherein detecting, based on computer-vision analysis of the video frame, the at least one object depicted by the video frame comprises detecting, based on computer-vision analysis of the video frame, a plurality of objects depicted by the video frame.

* * * * *